United States Patent
Derive et al.

(10) Patent No.: US 6,171,371 B1
(45) Date of Patent: Jan. 9, 2001

(54) PROCESS AND UNIT FOR PRODUCING OXYGEN BY ADSORPTION WITH A SHORT CYCLE

(75) Inventors: Nathalie Derive, Paris; Anne Dubois, Le Chesnay; Christian Monereau, Paris, all of (FR)

(73) Assignee: L'Air Liquide, Societe Anonyme pour l'etude et l'Exploitation des Procedes Georges Claude, Paris Cedex (FR)

( * ) Notice: Under 35 U.S.C. 154(b), the term of this patent shall be extended for 0 days.

(21) Appl. No.: 09/287,625

(22) Filed: Apr. 7, 1999

(30) Foreign Application Priority Data

Apr. 7, 1998 (FR) .................................................. 98 04305

(51) Int. Cl.$^7$ ................................................. B01D 53/053
(52) U.S. Cl. ................................. 95/98; 95/100; 95/103; 95/130; 96/130; 96/144
(58) Field of Search ....................... 95/96–98, 100–105, 95/130, 139; 96/130, 143, 144

(56) References Cited

U.S. PATENT DOCUMENTS

| | | | |
|---|---|---|---|
| 3,636,679 | * 1/1972 | Batta | 95/130 X |
| 4,561,865 | * 12/1985 | McCombs et al. | 95/130 X |
| 5,032,150 | * 7/1991 | Knaebel | 95/130 X |
| 5,163,978 | 11/1992 | Leavitt et al. | 55/18 |
| 5,370,728 | * 12/1994 | LaSala et al. | 95/130 X |
| 5,505,765 | * 4/1996 | Kaji et al. | 95/105 X |
| 5,518,526 | * 5/1996 | Baksh et al. | 95/130 X |
| 5,565,018 | * 10/1996 | Baksh et al. | 95/130 X |
| 5,658,371 | * 8/1997 | Smolarek et al. | 95/130 X |
| 5,679,134 | * 10/1997 | Brugerolle et al. | 95/130 X |
| 5,702,504 | * 12/1997 | Schaub et al. | 95/130 X |
| 5,735,938 | * 4/1998 | Baksh et al. | 95/105 X |
| 5,871,565 | * 2/1999 | Leavitt | 95/103 X |
| 5,882,380 | * 3/1999 | Sircar | 95/130 X |
| 5,928,407 | * 7/1999 | Amlinger | 95/130 X |
| 5,935,297 | * 8/1999 | Amlinger | 95/130 X |
| 5,961,694 | * 10/1999 | Monereau et al. | 95/130 X |
| 6,010,556 | * 1/2000 | Petit | 95/130 X |

FOREIGN PATENT DOCUMENTS

| | | |
|---|---|---|
| 0 663 229 | 7/1995 | (EP) . |
| 0 743 087 | 11/1996 | (EP) . |
| 0 758 625 | 2/1997 | (EP) . |

* cited by examiner

Primary Examiner—Robert H. Spitzer
(74) Attorney, Agent, or Firm—Young & Thompson

(57) ABSTRACT

The cycle employed is of the transatmospheric type with the use of a production buffer tank (C1), and with a purge/elution phase close to the low pressure in which gas output by another adsorber in the first cocurrent decompression phase is introduced in countercurrent into the adsorber (A, B) and, simultaneously, the countercurrent pumping is continued. During the production step, the oxygen produced is also sent into an auxiliary tank (C2), and the gas contained in this auxiliary tank is, with regard to the adsorber, used solely during a fraction of the pressurization phase of the adsorber.

11 Claims, 2 Drawing Sheets

PROCESS AND UNIT FOR PRODUCING OXYGEN BY ADSORPTION WITH A SHORT CYCLE

FIELD OF THE INVENTION

The present invention relates to a process for producing oxygen from air by transatmospheric pressure swing adsorption, of the type in which, using a unit having at least two adsorbers, a cycle of duration T is implemented in each adsorber, comprising successively and cyclically:

- a phase (a) of pressurization to the high pressure of the cycle using production oxygen introduced in countercurrent and/or air introduced in cocurrent, this phase ending with a cocurrent production step in which the oxygen produced is sent to a buffer volume;
- a first cocurrent decompression phase (b);
- a countercurrent purge phase (c) comprising pumping to the low pressure Pm of the cycle; and
- a purge/elution phase (d) in which gas output by another adsorber in the first cocurrent decompression phase (b) is introduced in countercurrent and, simultaneously, the countercurrent pumping is continued.

BACKGROUND OF THE INVENTION

PSA processes (Pressure Swing Adsorption) are being used more and more for producing oxygen with limited purity from atmospheric air. There is, of course, a constant preoccupation with reducing the cost of the oxygen to be produced. In order to do this, use may be made of adsorbents which are particularly specific and effective for $O_2/N_2$ separation, such as lithium-exchanged zeolites. However, the cost of these adsorbents is very much greater than that of conventional adsorbents such as 5A or 13X molecular sieves, so that one condition for their acceptance is that a small amount of adsorbents is necessary.

In order to minimize the volumes of adsorbents to be utilized, it has been proposed to shorten the cycle, in particular overlapping steps which have normally been sequential. Thus, the air may be introduced into the adsorber as soon as possible after the end of the purge/elution step, or immediately following it. However, all other things being equal, this introduction of air at low pressure has a detrimental effect on the propagation of the adsorption fronts, which advance commensurately faster if the pressure in the adsorbent is low.

This is true both for the retention of nitrogen and for that of atmospheric impurities (water, $CO_2$, traces of hydrocarbons, etc.), for which use is made either of a specific bed such as an alumina or silica gel bed, or an adsorbent used for $O_2/N_2$ separation. In all cases, the introduction of air at low pressure actually requires greater volumes of adsorbents, which is contrary to the intended result.

Furthermore, enlarging the zone allocated to retaining the impurities increases the volume of air which is unproductively compressed then pumped, with a negative effect on the specific energy.

One way of limiting these drawbacks is to minimize the quantity of air introduced at the lowest pressures by arranging for the pressure in the adsorber to rise very rapidly.

Thus, according to the teaching of EP 758 625 A1, FIGS. 4 and 5, after the purge/elution step the following steps are employed in a cycle of the aforementioned type, the duration of which is 120 seconds:

- first countercurrent repressurization using countercurrent decompression oxygen from the other adsorber, lasting 2 seconds;
- second repressurization, simultaneously in cocurrent by introducing air and in countercurrent using cocurrent decompression oxygen from the other adsorber, lasting 4 seconds;
- third repressurization, solely in cocurrent by introducing air, the outlet of the adsorber being closed, lasting 2 seconds; and
- a step of final repressurization and cocurrent production, lasting 44 seconds.

This leads to sequencing, in spite of the relatively long duration of the cycle, steps which have very short durations—from one second to a few seconds at most—with multiple valve-opening/closing operations in the short corresponding lapse of time.

SUMMARY OF THE INVENTION

The object of the invention is to make it possible, simply and reliably, to produce particularly short cycles, less than 120 seconds, typically less than 90 seconds, which consume little energy.

To this end, the invention relates to a process of the aforementioned type, characterized in that the buffer volume is subdivided into a buffer tank and into an auxiliary volume comprising an auxiliary pressurization tank, in that during an initial part of the production step, the oxygen produced is sent only into the auxiliary pressurization tank, and in that the gas contained in the auxiliary tank is, with regard to the adsorber, used solely during a fraction of the pressurization phase (a) of the adsorber.

The process according to the invention may have one or more of the following characteristics, taken alone or in any of their technically feasible combinations:

- the fraction has a duration at most equal to T/10, and preferably, for a cycle with a duration advantageously less than 120 seconds, at most equal to 10 seconds;
- during at least a part of the fraction, air is simultaneously introduced into the adsorber in cocurrent;
- during at least a part, in particular an initial part, of the fraction, gas output by another adsorber in the first cocurrent decompression phase (b) is simultaneously sent into the adsorber in countercurrent;
- during the fraction, the auxiliary tank is isolated from the buffer tank and this auxiliary tank is set in communication with the adsorber until the pressures are balanced between them;
- the isolation is carried out by means of a one-way valve which allows oxygen to flow from the auxiliary tank to the buffer tank, but prevents any reverse flow;
- the auxiliary tank is left in communication with the adsorber until the end of the pressurization phase (a), so that this auxiliary tank is returned to the high pressure of the cycle.

The invention also relates to a unit for producing oxygen from air by transatmospheric pressure swing adsorption, intended for the implementation of the process defined above. This unit, of the type comprising at least two adsorbers in parallel which are selectively connected to an air compressor, to a vacuum pump and to a buffer production tank, the outlets of the adsorbers being connected in pairs by a duct provided with a flow control valve, is characterized in that it comprises at least one auxiliary pressurization tank, means for selectively connecting this auxiliary tank to the outlet of each adsorber, and means which are intended to connect the auxiliary tank to the buffer tank and are designed to set these two tanks in communication when, and only when, the pressure of the auxiliary tank is at least equal to that of the buffer tank.

In particular embodiments of this unit:
the means for connecting the auxiliary tank to the buffer tank comprise a one-way valve;
the volume of the or each auxiliary tank is less than that of the buffer tank.

BRIEF DESCRIPTION OF THE DRAWINGS

Illustrated embodiments of the invention will now be described with reference to the appended drawings, in which.

DESCRIPTION OF THE PREFERRED EMBODIMENTS

Figure 1:
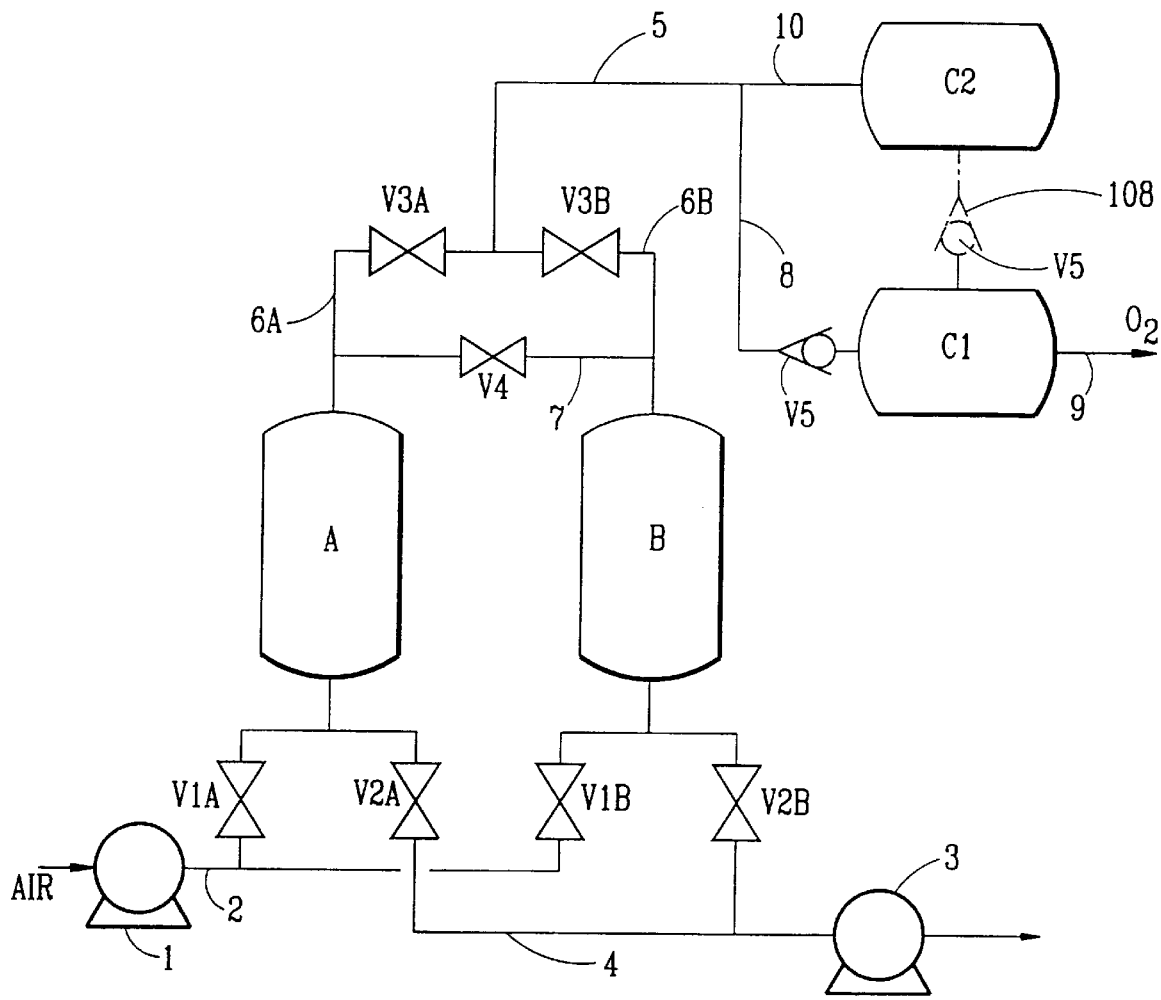
FIG. 1 schematically represents an oxygen production unit according to the invention.

The unit represented in FIG. 1 is advantageously intended for producing oxygen with limited purity, typically 85 to 95%, from atmospheric air by transatmospheric PSA adsorption.

This unit comprises, in the example represented: an air compressor 1; two adsorbers A and B; a line 2 for feeding air to the adsorbers, which connects the delivery of the compressor to the lower ends or inlets of the adsorbers via respective valves V1A and V1B; a vacuum pump 3 whose delivery is connected to the surrounding atmosphere; a discharge line 4 which connects the intake of the vacuum pump to the inlets of the adsorbers via respective valves V2A and V2B; and an oxygen circulation line 5 connected to the upper end or outlet of each adsorber by respective branches 6A and 6B equipped with respective valves V3A and V3B. The outlets of the two adsorbers are furthermore connected to one another by a purge/elution duct 7 equipped with a flow control valve V4.

Downstream, the line 5 is divided:
into a production duct 8 which is equipped with a non-return valve V5 and opens into a production buffer tank C1 of relatively large volume, from which the oxygen supply duct 9 departs, and
into a duct 10 opening into an auxiliary repressurization tank C2 of relatively small volume.

The non-return valve V5 allows oxygen to flow from an adsorber or the tank C2 to the tank C1, but prevents any reverse flow from C1 to an adsorber or to the tank C2.

Figure 2:
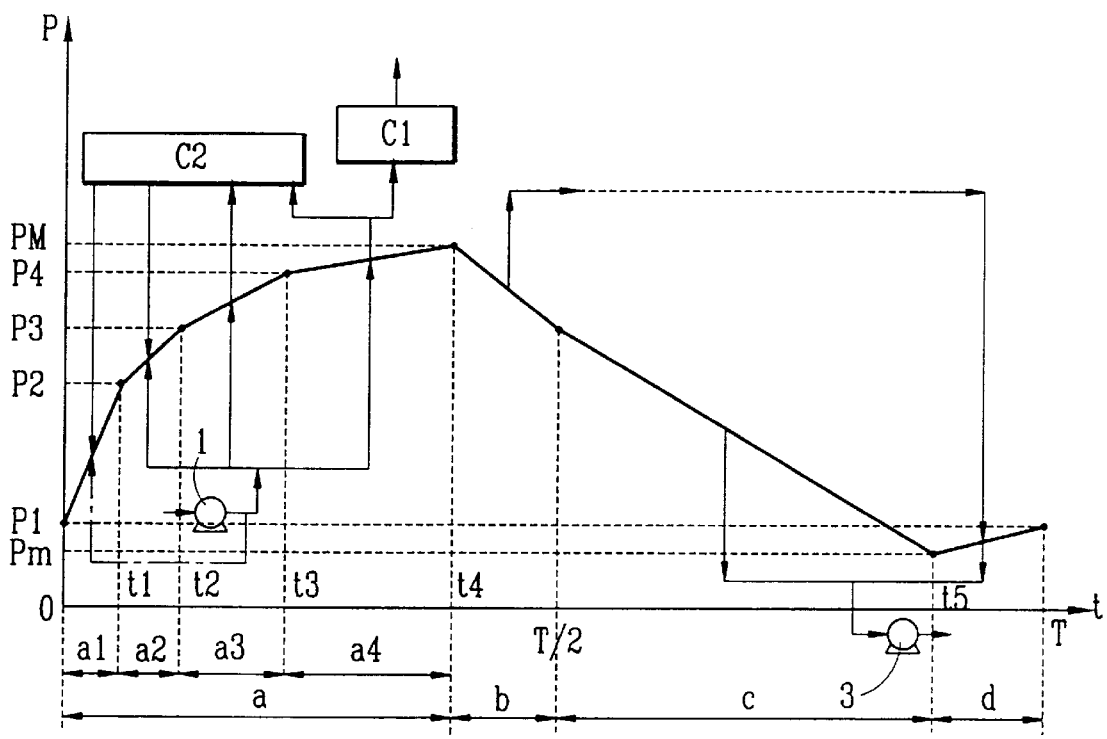
FIG. 2 is a diagram which illustrates a cycle according to the invention, employed using the unit in FIG. 1.

The unit furthermore includes means, which are known per se and have not been represented, for control, regulation and electrical supply, which are designed to carry out the cycle illustrated in FIG. 2.

In FIG. 2, in which the time t is plotted on the abscissa and the absolute pressure P is plotted on the ordinate, the lines directed by arrows indicate the motion and destinations of the gas streams and the direction in which they flow to and in the adsorber.

The cycle in FIG. 2, with a duration T less than 90 seconds, comprises the following successive steps. These steps are described for one of the adsorbers, for example adsorber A. Adsorber B undergoes the same steps, with a time shift of T/2, where T denotes the duration of the cycle.

(a) From t=0 to t4<T/2, a pressurization phase consisting of the following steps:

(a1) With the valves V1A, V2A and V4 closed, valve V3A is opened. The adsorber then undergoes, from t=0 to t1, first repressurization from the end of purge/elution pressure P1, slightly higher than the low pressure Pm of the cycle, to a first intermediate pressure P2. This first repressurization takes place solely in countercurrent with oxygen originating from the tank C2.

As soon as this step starts, the pressure in the tank C2 becomes less than that in the tank C1, which causes the valve V5 to close and therefore isolates the tank C1.

(a2) From t1 to t2, the valve V1A is furthermore opened. Second pressurization therefore occurs, both in countercurrent with oxygen originating from the tank C2 and in cocurrent with air. This step ends at the time t2 at which the pressures of the adsorber and of the tank C2 are equal to a second intermediate pressure P3. At this time, the flow of oxygen is reversed in the duct 5 without any valve being operated, and the phase moves on to the next step (a3).

(a3) From t2 to t3 it is A+C2 combined which increases in pressure, with a pressure rise rate that is commensurately higher as the volume of the tank C2 is smaller. This step ends at the time t3 at which the pressure in the tank C2 is equal to that in the tank C1, that is to say at a third intermediate pressure P4. At this time, the valve V5 opens by itself, and the phase moves on to the next step (a4).

(a4) From t=3 to t4, it is A+C1+C2 combined which increases in pressure from the pressure P4 to the high pressure of the cycle PM. The volume of the tank C1 is chosen to be large enough to ensure continuous production under a satisfactory minimum pressure P4. This volume is generally greater than that of the tank C2, for example in a ratio of between 1 to 1.3 and 1 to 2. The pressure rise from P4 to PM is markedly slower than in step (a3), and even more so because production oxygen has simultaneously been withdrawn from the tank C1.

The unit described above thus makes it possible, without any other valve movement of the oxygen side than opening the valve V3A, to ensure very rapid pressurization with oxygen followed by a rapid rise in pressure until the minimum production pressure is reached, finally followed by a slow pressure rise during the production phase.

The cycle continues conventionally with the following phases.

(b) From t4 to T/2, a first cocurrent depressurization phase, the gas output by the adsorber being sent to the other adsorber during the purge/elution phase (d) described below.

(c) From T/2 to t5, a countercurrent depressurization phase by pumping using the pump 3, until the low pressure Pm of the cycle is reached.

(d) From t5 to T, a purge/elution phase during which the adsorber receives, in countercurrent, the gas output by the other adsorber in the first cocurrent depressurization phase (b), and is simultaneously discharged in countercurrent by pumping using the pump 3. During this phase, the pressure rises slightly from Pm to P1.

As a variant, it is possible to introduce air in cocurrent starting with step (a1), that is to say starting at time t=0, as illustrated by a line of dots and dashes in FIG. 2. Also as a variant it is conversely possible not to start introducing air until time t2, corresponding to the full balancing of the pressures between the adsorber and the tank C2.

Figure 3:
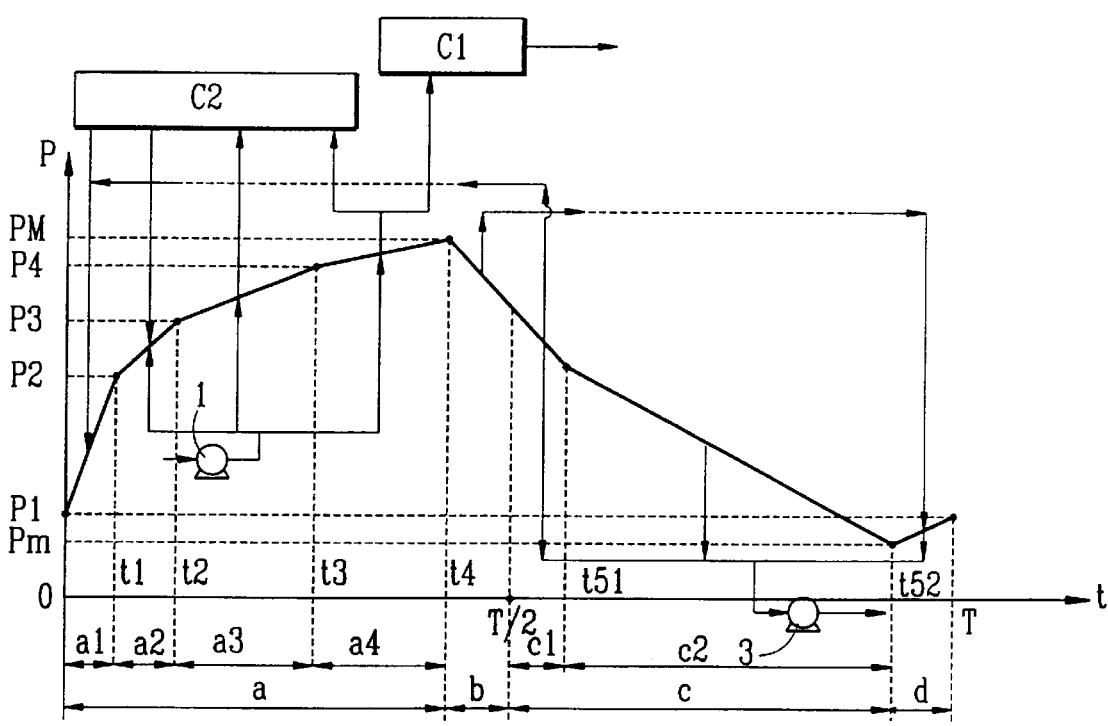
FIG. 3 is a similar diagram illustrating a variant of the cycle according to the invention.

In another variant, illustrated in FIG. 3, with a cycle of duration T of less than 100 seconds, the start of the pressurization with oxygen is accelerated by furthermore injecting into the adsorber, during step (a1), a fraction of the gas output from the cocurrent decompression of the other adsorber.

In order to do this, step (c) in FIG. 1 is replaced by the following two steps:
- (c1) From T/2 to a time t51, a second depressurization step in which gas is discharged in cocurrent from the adsorber and sent to the outlet of the other adsorber in the first repressurization step (a1) and, simultaneously, gas is discharged in countercurrennt by pumping using the pump 3; and
- (c2) From t51 to t52<T, a third depressurization step to the low pressure Pm, solely in countercurrent by pumping.

In correlation, the duration T—t52 of the purge/elution phase (d) is reduced to that of the first step (b) of the cocurrent depressurization.

It will be noted that it is advantageous to alter phase (a) in order to shorten the cycle, because this makes it possible to retain a duration for phases (b) and (d) which is sufficient for the kinetic effects, sensitive to these phases of the cycle, not to cause a substantial performance loss.

As a variant, the component V5 may be replaced by a valve controlled so as to open under the same conditions as a non-return valve. Furthermore, as illustrated by a line of dots and dashes in FIG. 1, the combination 8, V5 may be replaced by a direct connection 108, V5 between the two tanks C1 and C2.

In each of the variants described above, the adsorbers preferably have a ring bed and substantially radial flow of the gases through this bed, which makes it possible to reduce the head losses and therefore to minimize the specific energy.

By way of example, in the cycle of FIG. 2, the pressures and the durations may be as follows:

| Step/phase | Final pressure (bar) | Duration (seconds) |
| --- | --- | --- |
| (a1) | P2 = 0.7 to 0.9 | 1 to 3 |
| (a2) | P3 = 0.8 to 1.0 | 1 to 3 |
| (a3) | P4 = 1.0 to 1.2 | 3 to 8 |
| (a4) | PM = 1.3 to 1.5 | 6 to 16 |
| (b) | 0.9 to 1.1 | 3 to 10 |
| (c) | Pm = 0.3 to 0.5 | 12 to 30 |
| (d) | P1 = 0.5 to 0.7 | 3 to 10 |

Total duration of the cycle: T = 30 to 80 s

What is claimed is:

1. A process for producing oxygen from air by transatmospheric pressure swing adsorption, using a unit having at least two adsorbers, a cycle of duration T being implemented in each adsorber, the process comprising successively and cyclically:
- a phase of pressurization to a high pressure of the cycle using production oxygen introduced in countercurrent and/or air introduced in cocurrent, said phase ending with a cocurrent production step in which the oxygen produced is sent to a buffer volume;
- a first cocurrent decompression phase;
- a countercurrent purge phase comprising pumping to a low pressure of the cycle; and
- a purge/elution phase in which gas output by another adsorber in the first cocurrent decompression phase is introduced in countercurrent and, simultaneously, countercurrent pumping is continued;

wherein the buffer volume is subdivided into a buffer tank and into an auxiliary volume comprising an auxiliary pressurization tank, during an initial part of the production step, the oxygen produced is sent only into the auxiliary pressurization tank, and the gas contained in the auxiliary pressurization tank is, with regard to the adsorber, used solely during a fraction of the pressurization phase of the adsorber.

2. The process according to claim 1, wherein the fraction has a duration at most equal to 10 seconds.

3. The process according to claim 2, wherein the fraction has a duration at most equal to T/10.

4. The process according to claim 1, wherein during at least a part of said fraction, air is simultaneously introduced cocurrently into the adsorber.

5. The process according to claim 1, wherein during at least a part of said fraction, gas output by another adsorber in the first cocurrent decompression phase is simultaneously sent countercurrently into the adsorber.

6. The process according to claim 1, wherein during said fraction, the auxiliary pressurization tank is isolated from the buffer tank, and said auxiliary pressurization tank is set in communication with the adsorber until the pressures are balanced between them.

7. The process according to claim 6, wherein the isolation is carried out with a one-way valve which allows oxygen to flow from the auxiliary pressurization tank to the buffer tank, but prevents any reverse flow.

8. The process according to claim 6, wherein the auxiliary pressurization tank is left in communication with the absorber until the end of the pressurization phase, so that said auxiliary pressurization tank is returned to the high pressure of the cycle.

9. Apparatus for producing oxygen from air by transatmospheric pressure swing adsorption, comprising at least two adsorbers in parallel which are selectively connected to an air compressor, to a vacuum pump and to a buffer production tank, outlets of the adsorbers being connected in pairs by a duct provided with a flow control valve; the apparatus further comprising at least one auxiliary pressurization tank, means for selectively connecting said auxiliary pressurization tank to the outlet of each adsorber, and means which are intended to connect the auxiliary pressurization tank to the buffer tank and are designed to set the auxiliary pressurization tank and the buffer tank in communication when, and only when, the pressure of the auxiliary pressurization tank is at least equal to that of the buffer tank.

10. The apparatus according to claim 9, wherein the means for connecting the auxiliary pressurization tank to the buffer tank comprise a one-way valve.

11. The apparatus according to claim 9, wherein the volume of the or each auxiliary pressurization tank is less than that of the buffer tank.

* * * * *